(12) United States Patent
Oshida et al.

(10) Patent No.: US 7,191,857 B2
(45) Date of Patent: Mar. 20, 2007

(54) HYBRID VEHICLE AND METHOD FOR CONTROLLING THE SAME

(75) Inventors: Shuji Oshida, Saitama (JP); Yusuke Tatara, Saitama (JP); Kazuhiro Hara, Saitama (JP); Osamu Saito, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 273 days.

(21) Appl. No.: 10/671,560

(22) Filed: Sep. 29, 2003

(65) Prior Publication Data

US 2004/0060752 A1 Apr. 1, 2004

(30) Foreign Application Priority Data

Oct. 1, 2002 (JP) .......................... P.2002-288533

(51) Int. Cl.
*B60K 6/04* (2006.01)

(52) U.S. Cl. .................. 180/65.2; 903/942; 903/948

(58) Field of Classification Search ........... 180/65.2, 180/65.1, 243, 65.3, 65.4; 318/34, 49, 50, 318/103; 903/906, 942, 948

See application file for complete search history.

(56) References Cited

U.S. PATENT DOCUMENTS

| 4,055,786 | A | * | 10/1977 | DiMarzio | ................... | 318/562 |
|---|---|---|---|---|---|---|
| 5,266,891 | A | * | 11/1993 | Kumar et al. | ................ | 324/765 |
| 5,361,565 | A | * | 11/1994 | Bayer | ........................ | 254/292 |
| 5,635,805 | A | * | 6/1997 | Ibaraki et al. | .............. | 318/139 |
| 6,009,365 | A | * | 12/1999 | Takahara et al. | .............. | 701/54 |
| 6,028,402 | A | | 2/2000 | Kumar et al. | | |
| 6,064,161 | A | * | 5/2000 | Takahara et al. | ............ | 318/139 |
| 6,569,055 | B2 | * | 5/2003 | Urasawa et al. | ............... | 477/5 |
| 6,624,601 | B2 | * | 9/2003 | Arimitsu et al. | .............. | 318/34 |
| 6,646,394 | B2 | * | 11/2003 | Minagawa et al. | ......... | 318/151 |

FOREIGN PATENT DOCUMENTS

| EP | 0 486 996 A2 | 5/1992 |
|---|---|---|
| EP | 0 534 144 A1 | 3/1993 |

OTHER PUBLICATIONS

Karsten Gregers Lund; "Contactores y Arrancadores Danfoss CI-TI™ en el lado del motor del VLT®", The Danfoss Journal, vol. 50, No. 3-1997, 1997, pp. 12-13, XP002367761, Nordborg, Denmark.
Pabst W. et al.; "Energieversorgungs- und Klimaanlage des Innovationszuges der DB Regio" (Power supply and air conditioning installation in innovative trains of DB Regio); Elektrische Bahnen , Oldenbourg Verlag, Oldenbourg Verlag, Oldenbourg Industrieverlag, Munchen, DE, vol. 99, No. 5, May 2001, pp. 231-236, XP001039277.

* cited by examiner

*Primary Examiner*—Frank Vanaman
(74) *Attorney, Agent, or Firm*—Arent Fox LLP

(57) ABSTRACT

A running motor for assisting an engine in driving a vehicle or singly driving the vehicle and an auxiliary unit motor for driving a compressor for an air conditioner are controlled by a common inverter via a changeover switch. According to this construction, the running motor and the auxiliary unit motor can be driven by the single inverter, and this can contribute to the reduction in the number of components, costs, space and weight, when compared with a case where inverters are provided to be used exclusively for the running motor and the auxiliary unit motor, respectively.

12 Claims, 9 Drawing Sheets

HYBRID VEHICLE AND METHOD FOR CONTROLLING THE SAME

BACKGROUND OF THE INVENTION

1. Field of the Invention

The present invention relates to a hybrid vehicle having an engine and a primary motor as a drive source for running the vehicle, and a secondary motor used for any other purposes than as the drive source for running the vehicle, and a method for controlling the hybrid vehicle.

2. Description of the Related Art

Hybrid vehicles are known in which a running motor is connected to main driving wheels which are driven by an engine, or in which a running motor is connected to sub driving wheels which are disconnected from the engine. In these hybrid vehicles, fuel consumption can be saved by driving the running motor singly to run the vehicle, by running the vehicle while causing the running motor to assist the engine in driving the vehicle, or by causing the running motor to function as a generator to perform a regenerative braking operation when the vehicle is decelerated so that kinetic energy of the vehicle is reclaimed and stored as electric energy.

Incidentally, with a view to saving the fuel consumption further, in case an engine "idling Stop" control is adopted to stop the engine when the vehicle comes to a stop, the compressor for the air conditioner and the hydraulic pump which are driven by the engine are also stopped, which leads to problems that the comfortableness of passengers in the vehicle is deteriorated while the idling stop is being implemented and that the rise of oil pressure is delayed when the vehicle is started from rest, whereby a smooth start of the vehicle is interrupted.

Then, it is conceived that auxiliary units such as the compressor and the hydraulic pump which are driven by the engine in related art are driven by auxiliary unit motors. However, in case an inverter is needed for each auxiliary unit motor, several inverters need to be provided in addition to one for the running motor. With the aforesaid related-art hybrid vehicle, however, since an electric oil pump is needed in addition to the oil pump driven by the engine, there is caused a problem that the number of components, costs, space and weight are increased.

SUMMARY OF THE INVENTION

The invention was made in view of these situations, and an object thereof is to provide a hybrid vehicle and a method for controlling the hybrid vehicle, the hybrid vehicle comprising a primary motor as a drive source for running the vehicle and a secondary motor used for any other purposes than as the drive source for running the vehicle, wherein the number of inverters for driving the primary and secondary motors is reduced so as to reduce the number of components, costs, space and weight.

With a view to attaining the object, according to a first aspect of the invention, there is proposed a hybrid vehicle comprising an engine and a primary motor as a drive source for running the vehicle, a secondary motor used for any other purposes than as the drive source for running the vehicle, and a switching unit for controlling the primary motor and the secondary motor via a common inverter.

According to the construction, by provision of the switching unit for controlling the primary motor as the drive source for running the vehicle and the secondary motor used for any other purposes than as the drive source for running the vehicle via the common inverter, the primary and secondary motors can be driven by the common inverter, which can contribute to the reduction in the number of components, costs, space and weight.

In addition, according to a second aspect of the invention, there is proposed a hybrid vehicle as set forth in the first aspect of the invention, wherein the secondary motor is an auxiliary unit driving motor.

According to the construction, since the secondary motor is the auxiliary unit driving motor, the auxiliary unit can be driven by the secondary motor without any problem.

Additionally, according to a third aspect of the invention, there is proposed a hybrid vehicle as set forth in the second aspect of the invention, wherein in the event that the secondary motor is required to be driven while the vehicle is being driven by the primary motor with the engine being stopped, the inverter is switched to drive the secondary motor by the switching unit after the engine has been started up and the primary motor has been stopped.

According to the construction, in the event that the secondary motor is required to be driven while the vehicle is being driven by the primary motor with the engine being stopped, since the inverter is switched to drive the secondary motor by the switching unit after the engine has been started up and the primary motor has been stopped, the secondary motor used for any other purposes than as the drive source for running the vehicle can be driven by the inerter without any problem while the vehicle is being run by the engine in place of the primary motor.

In addition, according to a fourth aspect of the invention, there is proposed a hybrid vehicle as set forth in the first aspect of the invention, wherein in the event that the primary motor is required to be driven while an auxiliary unit is being driven by the secondary motor, the inverter is switched to drive the primary motor by the switching unit after the secondary motor has been stopped, and the auxiliary unit which has been driven by the secondary motor is then driven by the engine.

According to the construction, in the event that the primary motor is required to be driven while an auxiliary unit is being driven by the secondary motor, since the inverter is switched to drive the primary motor by the switching unit after the secondary motor has been stopped and the auxiliary unit which has been driven by the secondary motor is then driven by the engine, the auxiliary unit can be driven by the engine without any problem while the primary motor is driven by the inverter so as to rung the vehicle.

Additionally, according to a fifth aspect of the invention, there is proposed a hybrid vehicle as set forth in the second aspect of the invention, wherein the secondary motor is at least any of a motor for driving a compressor for an air conditioner, a motor for driving an oil pump, and a motor for starting up the engine.

According to the construction, since the secondary motor is at least any of a motor for driving a compressor for an air conditioner, a motor for driving an oil pump, and a motor for starting up the engine, air conditioning, generating an oil pressure or starting up the engine can be implemented by the secondary motor.

Note that a running motor M1 in an embodiment corresponds to the primary motor of the invention, an auxiliary unit motor M2 in the embodiment corresponds to the secondary motor in the invention, and a changeover switch S in the embodiment corresponds to the switching unit in the invention.

DETAILED DESCRIPTION OF THE INVENTION

A mode for carrying out the invention will be described below based on an embodiment illustrated in the accompanying drawings.

Figure 1:
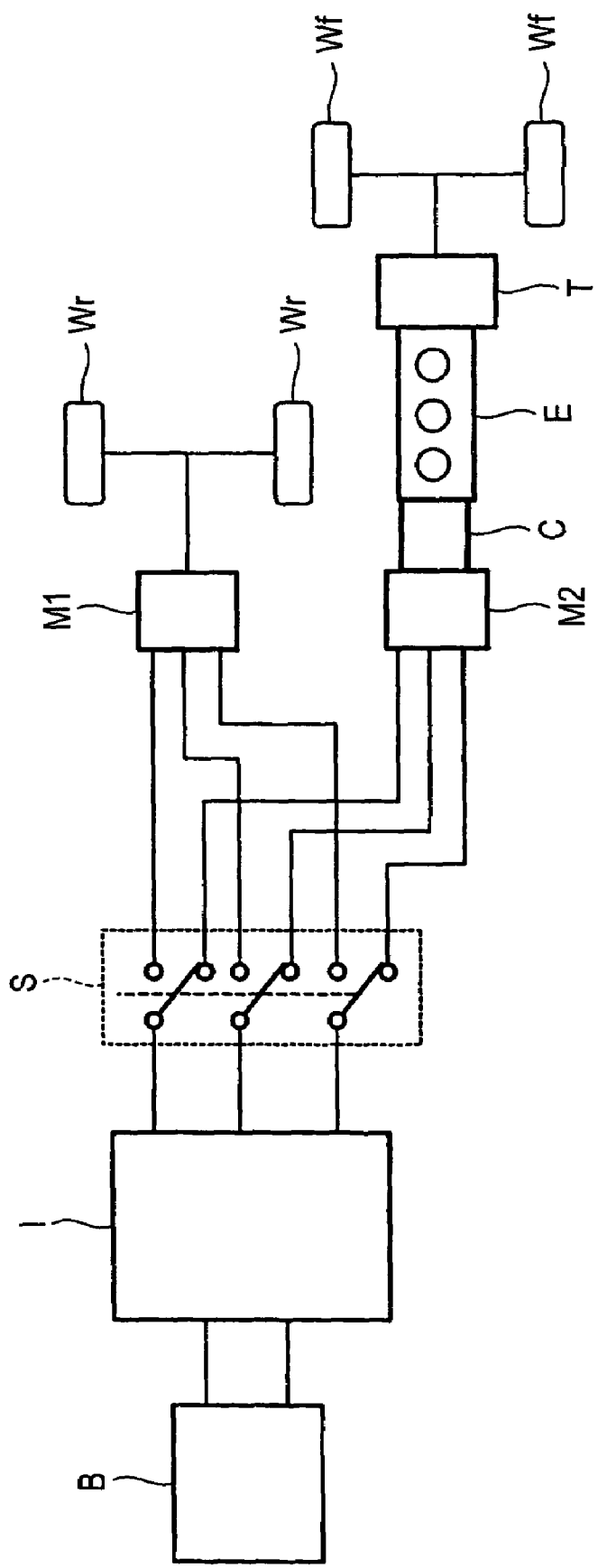
FIG. 1 is a diagram showing an overall configuration of a power train for a hybrid vehicle according to a first embodiment.
Figure 2:
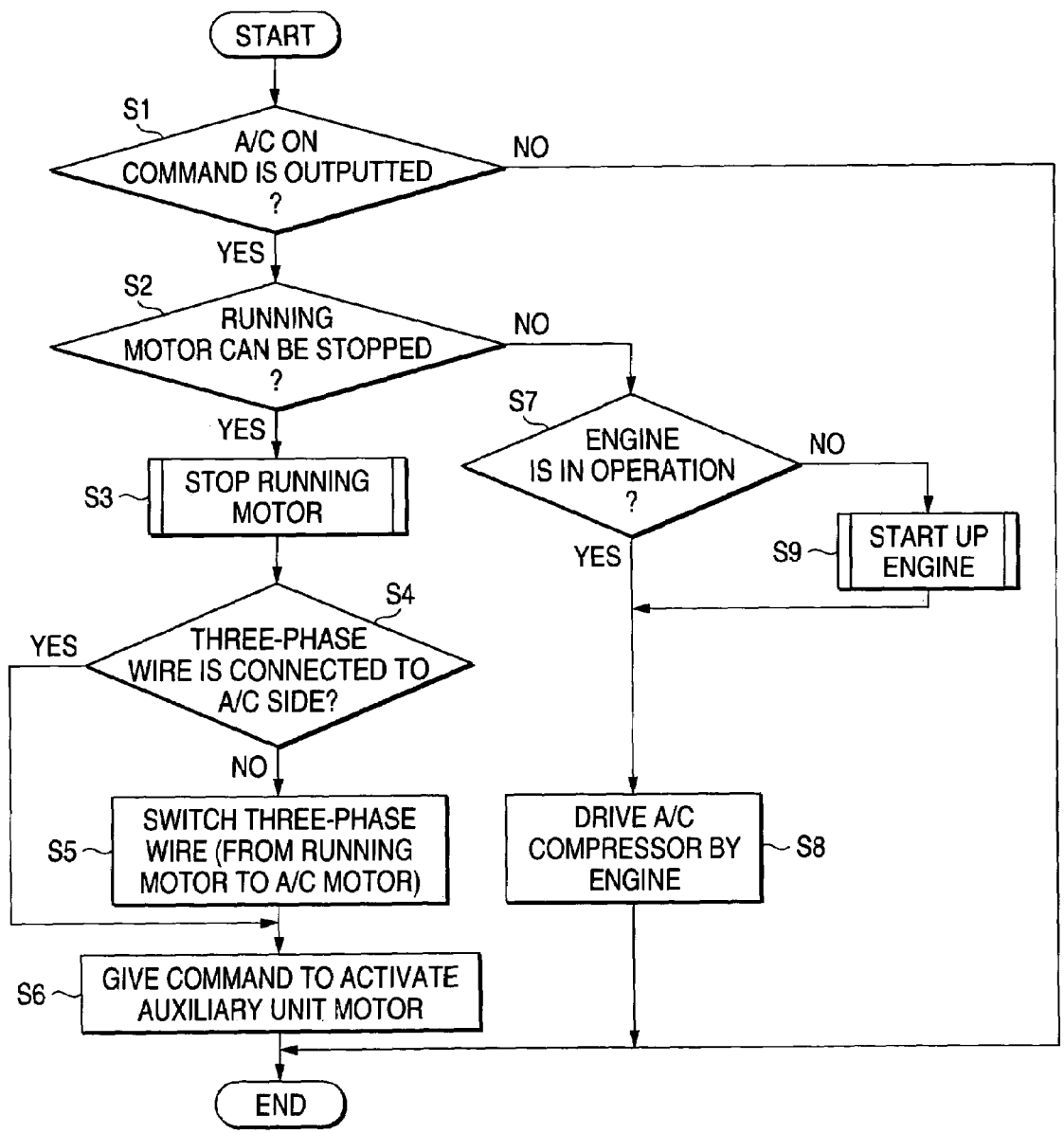
FIG. 2 is a flowchart showing a changeover from a running motor to an auxiliary unit motor.
Figure 3:
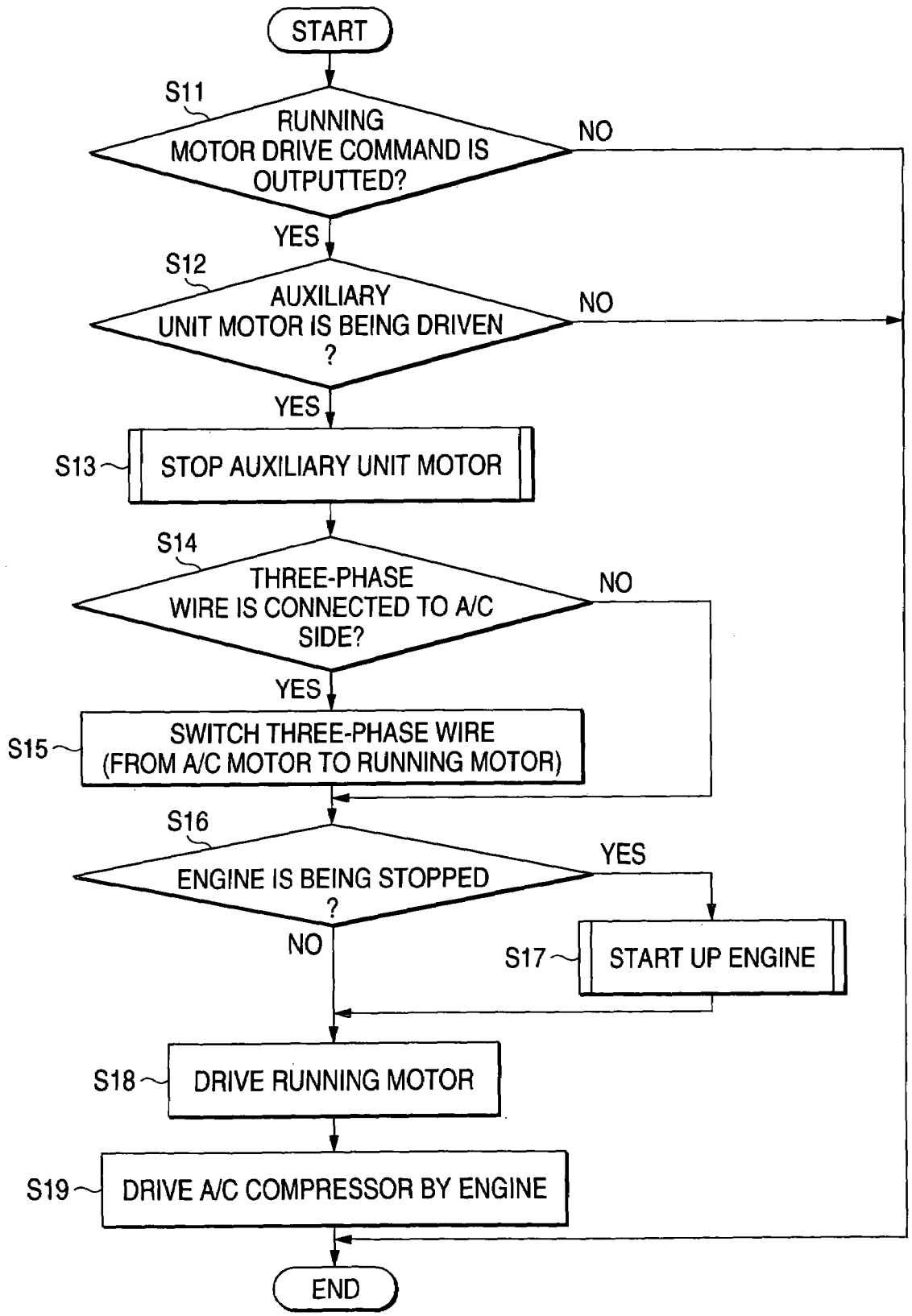
FIG. 3 is a flowchart showing a changeover from the auxiliary unit motor to the running motor.

FIGS. 1 to 3 show a first embodiment of the invention, in which FIG. 1 is a diagram showing an overall configuration of a power train for a hybrid vehicle, FIG. 2 is a flowchart showing a changeover from a running motor to an auxiliary unit motor, and FIG. 3 is a flowchart showing a changeover from the auxiliary unit motor to the running motor.

As shown in FIG. 1, left and right front wheels Wf, Wf of a vehicle V are connected to an engine E via a transmission to be driven thereby, and left and right rear wheels Wr, Wr thereof are connected to a running motor M1 to be driven thereby. A compressor C for an air conditioner is connected to an engine crankshaft and an auxiliary unit motor M2, so that the compressor C can be driven by either of the engine crankshaft and the auxiliary unit motor M2. An inverter I for converting direct current of a battery B to three-phase alternating current is selective connected to either of the running motor M1 and the auxiliary unit motor M2 via a changeover switch S.

Thus, when the vehicle V runs under low load, the engine E is stopped, and the vehicle V is driven by driving the rear wheels Wr, Wr by the running motor M1, whereas when the vehicle V runs under high load, the vehicle V is driven not only by driving the front wheels Wf, Wf by the engine E but also by driving the rear wheels Wr, Wr by the running motor M1 as required, thus the running motor M1 assisting the engine E in driving the vehicle V. In addition, when the vehicle V is decelerated, the running motor M1 is made to function as a generator, whereby kinetic energy of the vehicle V is reclaimed so as to be stored as electric energy for charging the battery B.

Next, a changeover of driving modes from driving the running motor M1 to driving the auxiliary unit motor M2 will be described based on the flowchart in FIG. 2.

Firstly, when a command to switch on the air conditioner is outputted in step S1, if it is determined in step S2 that the running motor M1 can be stopped, then an action is taken to stop the running motor M1 in step S3. In the following step S4, if it is determined that a three-phase wire from the inverter I is not connected to the auxiliary unit motor M2 for driving the compressor C of the air conditioner by the changeover switch, the changeover switch S is activated, in step S5, so as to disconnect the three-phase wire from the inverter I from the running motor M1 for connection to the auxiliary unit motor M2. Then, a command to activate the auxiliary unit motor M2 is outputted in step S6.

On the contrary, when it is determined in step S2 that the running motor M1 cannot be stopped, if the engine E is determined to be in operation in step S7, then, the compressor C for the air conditioner is driven by the engine E in step S8. In contrast, if the engine E is determined in step S7 that the engine E is not in operation, then, the engine E is started up in step S9, and thereafter, the compressor C for the air conditioner is driven by the engine E in step S8.

Next, a changeover of driving modes from driving the auxiliary unit motor M2 to driving the running motor M1 will be described based on the flowchart in FIG. 3.

Firstly, when a command to drive the running motor M1 is outputted in step S11, if it is determined in step S12 that the auxiliary unit motor M2 is in operation, an action is taken to stop the auxiliary unit motor M2 in step S13. If it is determined in the following step S14 that the three-phase wire from the inverter I is connected to the auxiliary unit motor M2 by the changeover switch S, then the changeover switch S is activated, in step S15, to disconnect the three-phase wire from the inverter I from the auxiliary unit motor M2 for connection to the running motor M1.

If it is determined in the following step S16 that the engine E is being stopped, after the engine E is started up in step S17, an action is taken to drive the running motor M1 in step S18, and the compressor C for the air conditioner is driven by the engine E in step S19.

According to the first embodiment, since the inverter I for converting direct current of the battery B to three-phase alternating current can be selectively connected to either of the running motor M1 and the auxiliary unit motor M2 via the changeover switch S. Therefore, both the running motor M1 and the auxiliary unit motor M2 can be driven by the common inverter I, and when compared with a case where the running motor Ml and the auxiliary unit motor M2 are driven by inverters which are provided to be used exclusively therefore, the number of components, assembling man hours, installation space and costs can be reduced.

In addition, in the event that a command to switch on the air conditioner is given while the vehicle V is driven by the running motor M1 with the engine being stopped, since the engine E is started up so as to drive the vehicle V by driving force of the engine E, the inverter I can be disconnected from the running motor M1, whereby the inverter I can be connected to the auxiliary unit motor M2 so as to allow the auxiliary unit motor M2 to drive the compressor C, thereby making it possible to allow the air conditioner to operate without any problem.

Furthermore, in the event that the running motor Ml is required to be driven while the compressor C is being driven by the auxiliary unit motor M2, after the auxiliary unit motor M2 has been stopped, the inverter I is disconnected from the auxiliary unit motor M2 by the changeover switch S for connection to the running motor M1, whereby the running motor M1 is driven without any problem, and the vehicle V can be driven accordingly. Then, the compressor C is driven by the engine E in place of the auxiliary unit motor M2 which is then stopped, whereby the air conditioner is allowed to operate without any problem.

Figure 4:
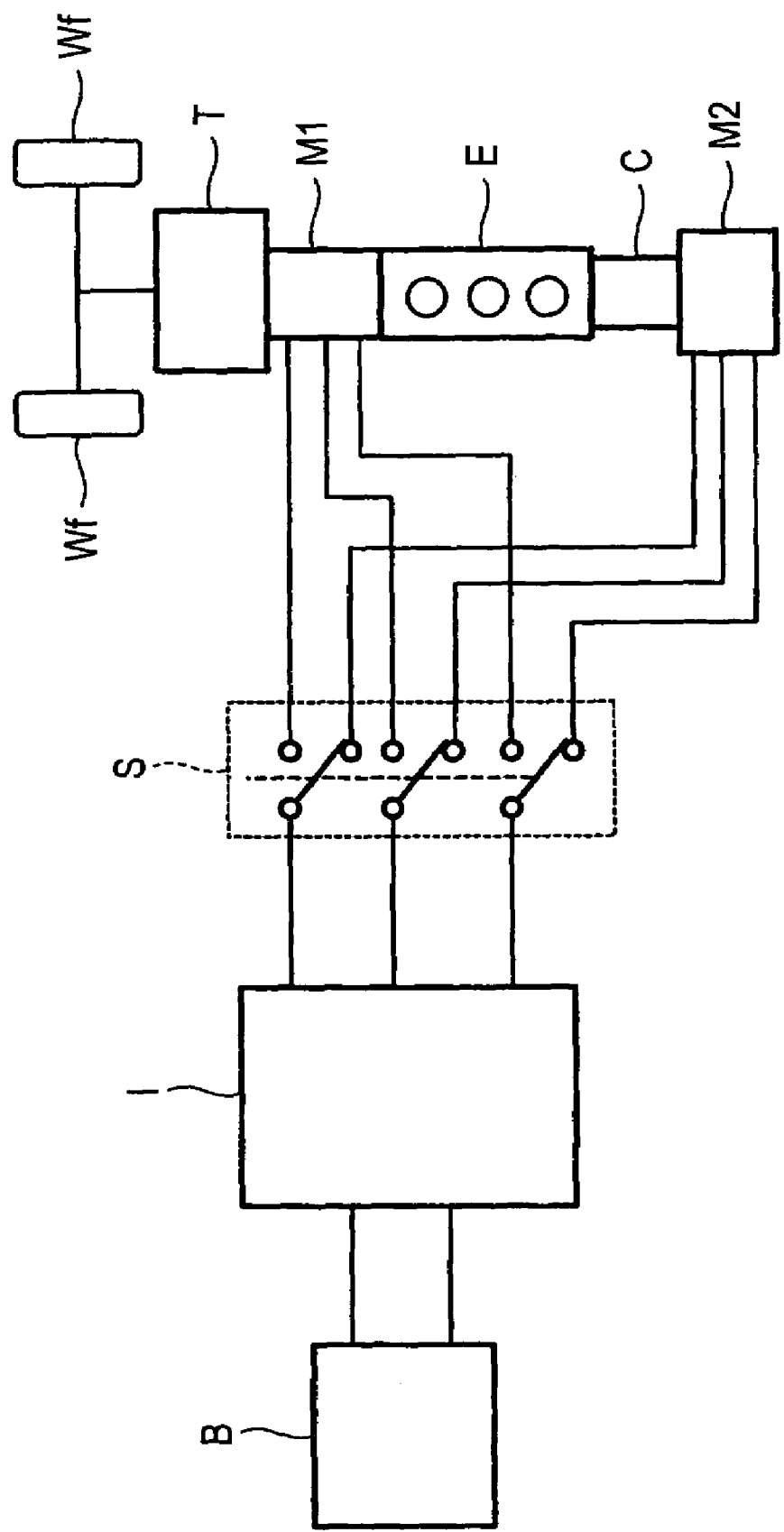
FIG. 4 is a diagram showing an overall configuration of a power train for a hybrid vehicle according to a second embodiment.

Next, a second embodiment of the invention will be described based on FIG. 4.

While the front wheels Wf, Wf are driven by the engine E and the rear wheels Wr, Wr are driven by the running motor M1, in the first embodiment, in the second embodiment, the front wheels Wf, Wf are constructed to be driven by the engine E and the running motor M1. Namely, the running motor M1 is disposed in line between the engine E and the transmission T, and, similarly to the first embodiment, the compressor C for the air conditioner is constructed to be driven by either of the engine E and the auxiliary unit motor M2. Moreover, the inverter I can be selectively connected to the running motor M1 and the auxiliary unit motor M2 by the changeover switch S.

Consequently, in this embodiment, too, the vehicle V can be driven by the engine E and/or the running motor M1, and the compressor C can be driven by the engine E or the auxiliary unit motor M2. The functions described by reference to the flowcharts shown in FIGS. 2 and 3 can also be applied to this second embodiment as they are.

Figure 6:
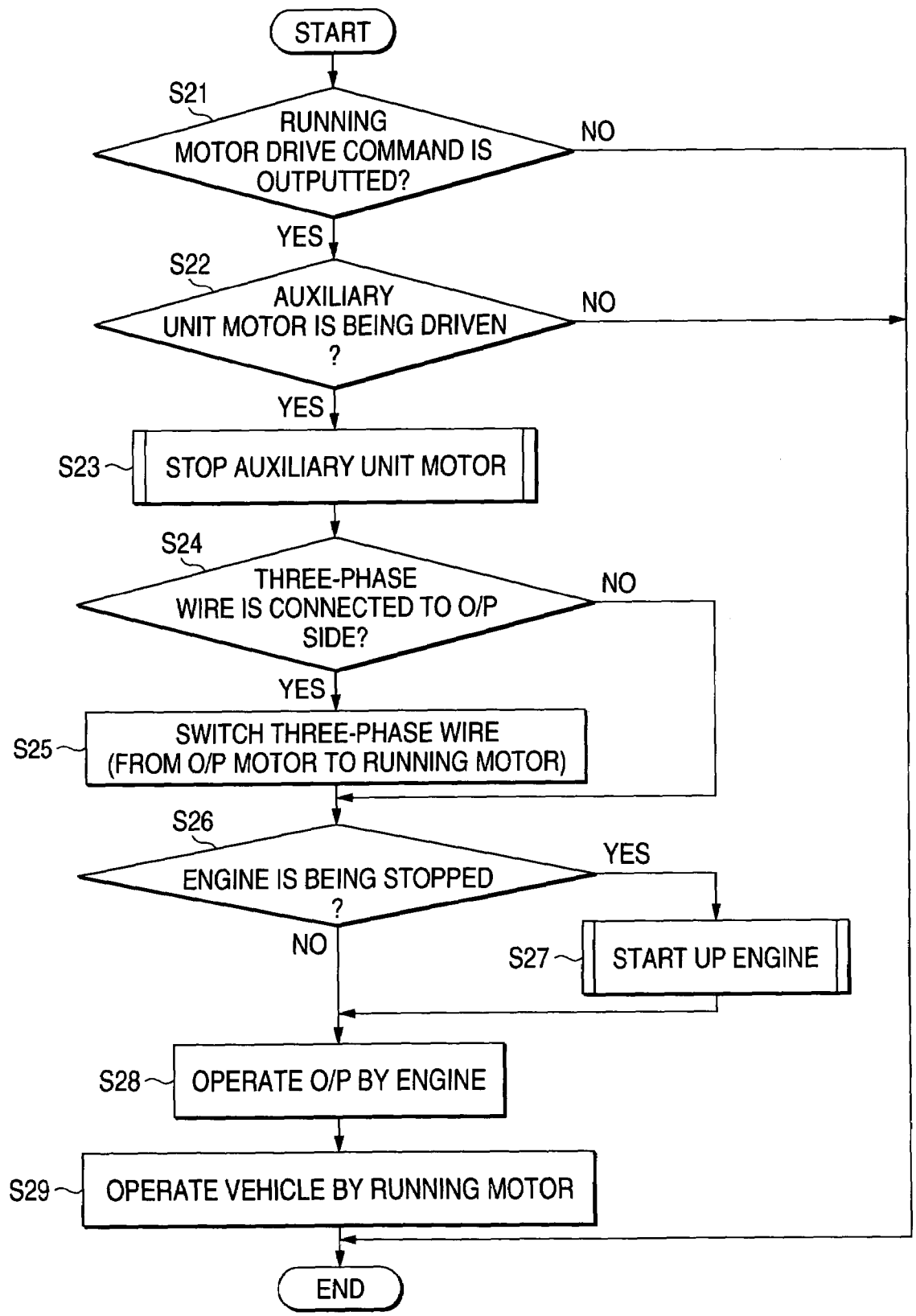
FIG. 6 is a flowchart showing a changeover from the auxiliary unit motor to the running motor.
Figure 7:
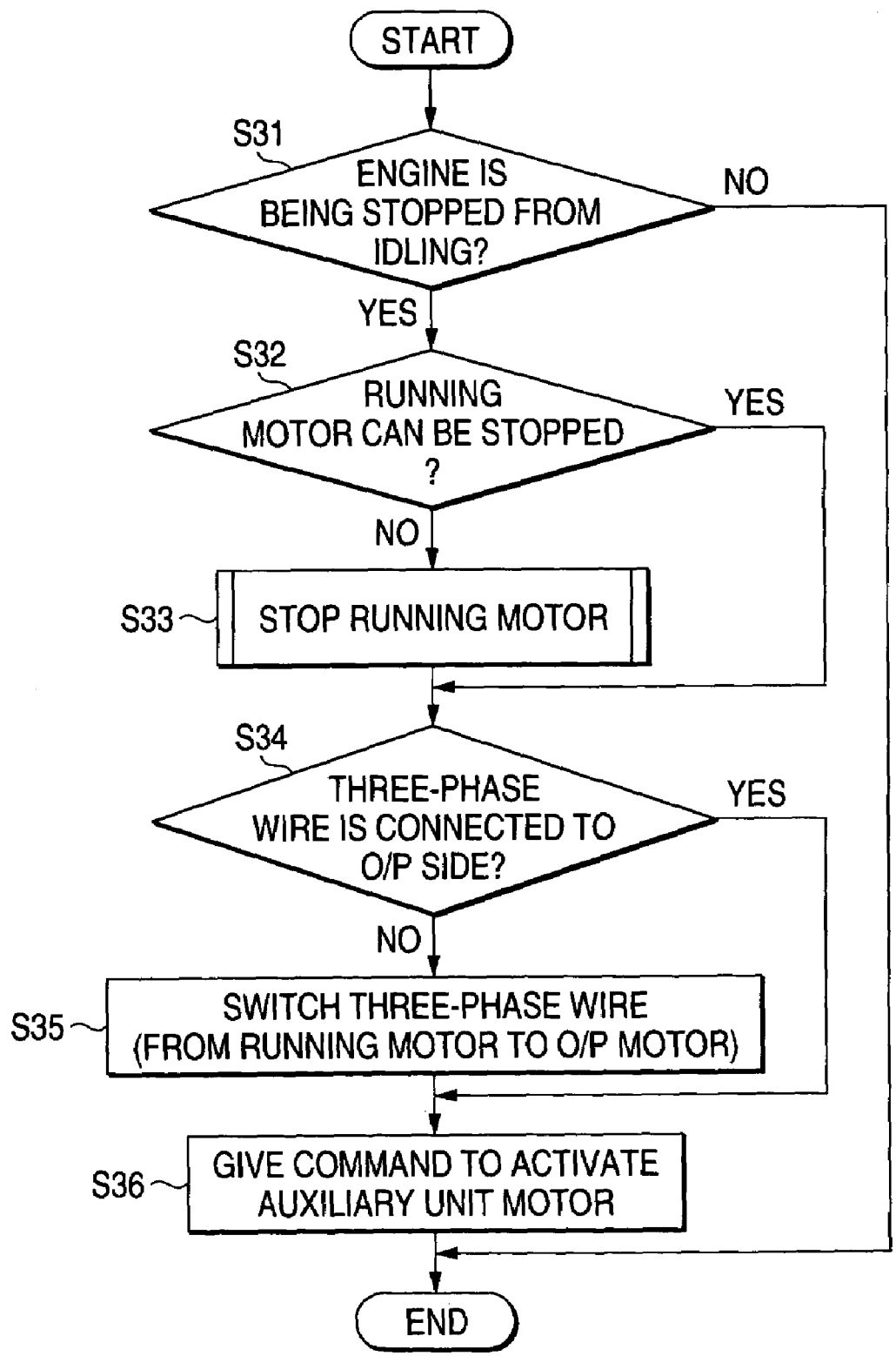
FIG. 7 is a flowchart showing a changeover from the running motor to the auxiliary unit motor.

Next, a third embodiment of the invention will be described based on FIGS. 5 to 7.

Figure 5:
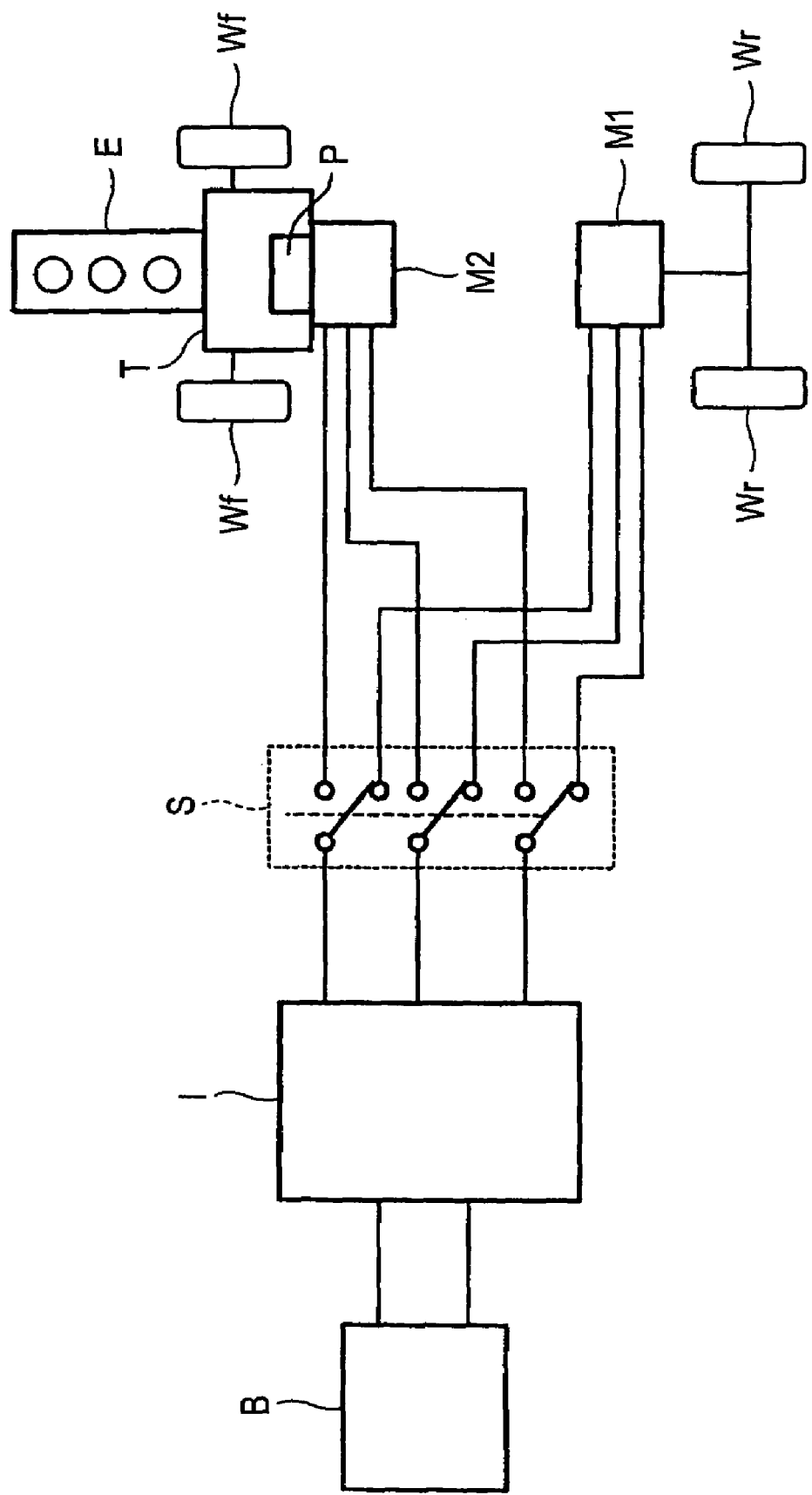
FIG. 5 is a diagram showing an overall configuration of a power train for a hybrid vehicle according to a third embodiment.

As is clear from FIG. 5, the third embodiment is a modification to the first embodiment, and an oil pump P, instead of the compressor C of the air conditioner, is driven by the engine E or the auxiliary unit motor M2.

Next, a changeover of driving modes from driving the auxiliary unit motor M2 to driving the running motor M1 will be described based on a flowchart shown in FIG. 6.

Firstly, when a command to drive the running motor M1 is outputted in step S21, if it is determined in step S22 that the auxiliary unit motor M2 is being driven, an action to stop the auxiliary unit motor M2 is taken in step S23. If it is determined in the following step S24 that the three-phase wire from the inverter I is connected to the auxiliary unit motor M2 by the changeover switch S, then the changeover switch S is activated, in step S25, to disconnect the three-phase wire from the inverter I from the auxiliary unit motor M2 for connection to the running motor M1.

If it is determined in the following step S26 that the engine E is being stopped, then, after the engine E is started up in step S27, the oil pump P is driven by the engine E in step S28, and the vehicle V is made to continue to be driven by the running motor M1 in step S29.

Next, a changeover of driving modes from driving the running mode Ml to driving the auxiliary unit motor M2 will be described based on a flowchart shown in FIG. 7.

Firstly, if it is determined in step S31 that the engine E is being stopped from idling and if it is determined in step S32 that the running motor M1 is not being stopped, an action is taken to stop the running motor M1 in step S33. If it is determined in the following step S34 that the three-phase wire from the inverter I is not connected to the auxiliary unit motor M2 for driving the oil pump P by the changeover switch S, then, the changeover switch S is activated, in step S35, to disconnect the three-phase wire from the inverter I from the running motor M1 for connection to the auxiliary unit motor M2. Then, a command to activate the auxiliary unit motor M2 is outputted so as to drive the oil pump P in step S36.

Thus, in this third embodiment, too, a function and advantage which are similar to those provided by the first and second embodiments can also be attained.

Next, a fourth embodiment of the invention will be described based on FIGS. 8 and 9.

Figure 8:
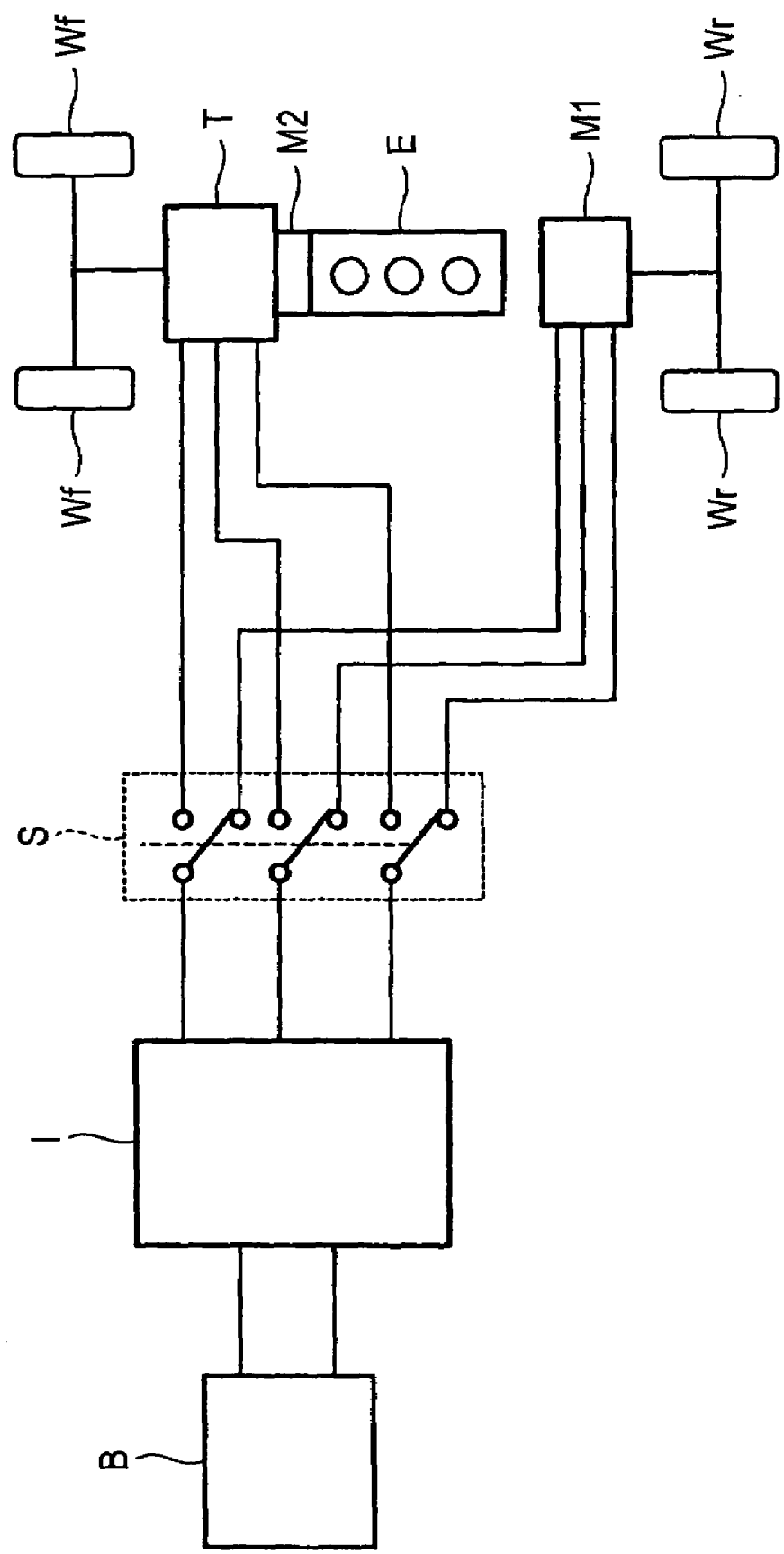
FIG. 8 is a diagram showing an overall configuration of a power train for a hybrid vehicle according to a fourth embodiment.
Figure 9:
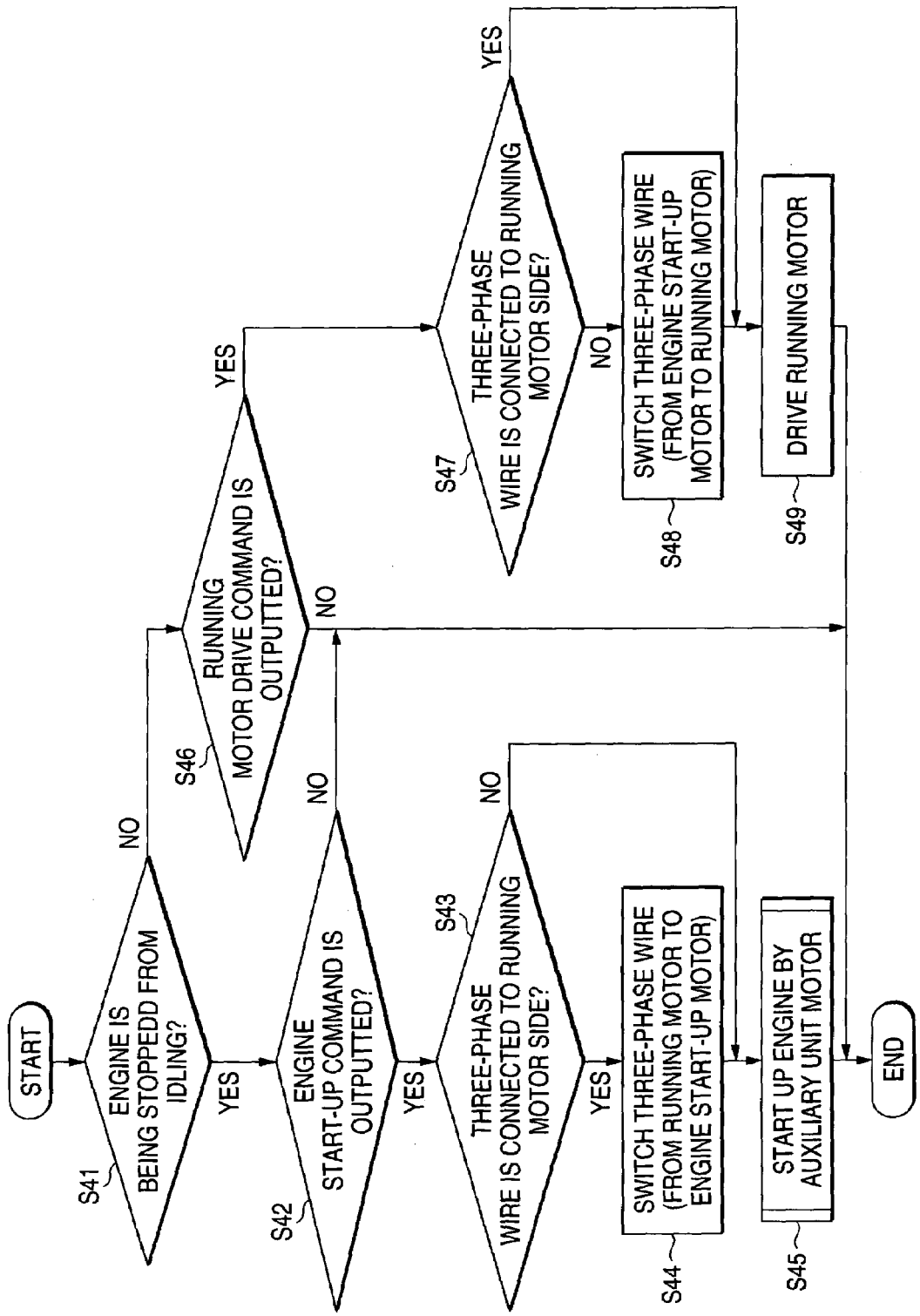
FIG. 9 is a flowchart showing a changeover between an auxiliary unit motor and the running motor.

As is clear from FIG. 8, the fourth embodiment is a modification to the first embodiment, and in this embodiment, in place of the auxiliary unit motor M2 for driving the compressor C for the air conditioner, an auxiliary unit motor M2 for cranking up the engine E to start it up is provided between the engine E and the transmission T.

Next, a changeover of driving modes between driving the running motor M1 and driving the auxiliary unit motor M2 will be described based on a flowchart shown in FIG. 9.

Firstly, if it is determined in step S41 that the engine is being stopped from idling and when a command to start up the engine E is outputted in step S42, if it is determined in step S43 that the three-phase wire from the inverter I is connected to the running motor M1, then, the changeover switch S is activated, in step S44, to disconnect the three-phase wire from the inverter I from the running motor M1 for connection to the auxiliary unit motor M2. Then, the engine is cranked up to be started up by the auxiliary unit motor M2 in step S45.

On the contrary, if it is determined in step S41 that the engine is not stopped from idling, when a command to drive the running motor M1 is outputted in step S46, and if it is determined in step S47 that the three-phase wire from the inverter I is not connected to the running motor M1, then the changeover switch S is activate, in step S48, to disconnect the three-phase wire from the inverter I from the auxiliary unit motor M2 for connection to the running motor M1. Then, the running motor M1 is driven to drive the vehicle V in step S49.

Thus, in this fourth embodiment, too, a function and advantage which are similar to those provided by the first to third embodiments can also be attained.

Thus, while the embodiment of the invention have been described heretofore, the invention can be modified in various ways with respect-to designs without departing from the spirit and scope thereof.

For example, while, in the embodiments, the motor for driving the compressor for the air conditioner, the motor for driving the oil pump and the motor for cranking up the engine are illustrated as the auxiliary unit motor M2, the auxiliary unit motor M2 may be used for any other purposes, and the secondary motor of the invention may constitute any other motors than the auxiliary unit motor M2 provided that the secondary motor does not constitute the running motor M1.

According to the construction, by provision of the switching unit for controlling the primary motor as the drive source for running the vehicle and the secondary motor used for any other purposes than as the drive source for running the vehicle via the common inverter, the primary and secondary motors can be driven by the common inverter, which can contribute to the reduction in the number of components, costs, space and weight.

In addition, according to the second aspect of the invention, since the secondary motor is the auxiliary unit driving motor, the auxiliary unit can be driven by the secondary motor without any problem.

Additionally, according to the third aspect of the invention, in the event that the secondary motor is required to be driven while the vehicle is being driven by the primary motor with the engine being stopped, since the inverter is switched to drive the secondary motor by the switching unit after the engine has been started up and the primary motor has been stopped, the secondary motor used for any other purposes than as the drive source for running the vehicle can be driven by the inerter without any problem while the vehicle is being run by the engine in place of the primary motor.

In addition, according to the fourth aspect of the invention, in the event that the primary motor is required to be driven while an auxiliary unit is being driven by the secondary motor, since the inverter is switched to drive the primary motor by the switching unit after the secondary motor has been stopped and the auxiliary unit which has been driven by the secondary motor is then driven by the engine, the auxiliary unit can be driven by the engine without any problem while the primary motor is driven by the inverter so as to rung the vehicle.

Additionally, according to the fifth aspect of the invention, since the secondary motor is at least any of the motor for driving a compressor for an air conditioner, the motor for driving an oil pump, and the motor for starting up the engine, air conditioning, generating an oil pressure or starting up the engine can be implemented by the secondary motor.

What is claimed is:

1. A hybrid vehicle comprising:
   an engine and a primary motor as a drive source for running the vehicle;
   a secondary motor that is free from being used as the drive source for running the vehicle; and
   a switching unit for controlling the primary motor and the secondary motor via a common inverter,
   wherein the switching unit is disposed between the common inverter and the primary and secondary motors, and
   wherein the secondary motor is an auxiliary unit driving motor, and wherein when the secondary motor is required to be driven while the vehicle is being driven by the primary motor with the engine being stopped, the inverter is switched to drive the secondary motor by the switching unit after the engine has been started up and the primary motor has been stopped.

2. The hybrid vehicle according to claim 1, wherein the secondary motor is at least one of a motor that drives a compressor of an air conditioner and a motor that drives an oil pump.

3. A hybrid vehicle comprising:
   an engine and primary motor as a drive source for running the vehicle;
   a secondary motor that is free from being used as the drive source for running the vehicle; and
   a switching unit for controlling the primary motor and the secondary motor via a common inverter,
   wherein the switching unit is disposed between the common inverter and the primary and secondary motors, and
   wherein the secondary motor is an auxiliary unit driving motor, and
   wherein when the primary motor is required to be driven while an auxiliary unit is being driven by the secondary motor, the inverter is switched to drive the primary motor by the switching unit after the secondary motor has been stopped, and the auxiliary unit which has been driven by the secondary motor is then driven by the engine.

4. The hybrid vehicle according to claim 3, wherein the secondary motor is at least one of a motor that drives a compressor of an air conditioner and a motor that drives an oil pump.

5. A method for controlling a hybrid vehicle including an engine and a primary motor as a drive source for running the vehicle, and a secondary motor that is free from being used as the drive source for running the vehicle, the method comprising:
   disposing a switching unit between a common inverter and the primary and secondary motors; and
   controlling the primary motor and the secondary motor via the common inverter,
   wherein the secondary motor is an auxiliary unit driving motor, and
   wherein the controlling step includes using the switching unit to switch the inverter to the secondary motor form the primary motor after the engine has been started up and the primary motor has been stopped, in the event that the secondary motor is required to be driven while the vehicle is being driven by the primary motor with the engine being stopped.

6. A method for controlling a hybrid vehicle including an engine and a primary motor as a drive source for running the vehicle, and a secondary motor that is free from being used as the drive source for running the vehicle, the method comprising:
   disposing a switching unit between a common inverter and the primary and secondary motors; and
   controlling the primary motor and the secondary motor via the common inverter,
   wherein the secondary motor is an auxiliary unit driving motor, and
   wherein the controlling step includes using the switching unit to switching unit to switch the inverter to the primary motor form the secondary motor after the secondary motor is then driven by the engine, in the event that the primary motor is required to be driven while the auxiliary unit is being driven by the secondary motor.

7. A hybrid vehicle comprising:
   an engine and a primary motor as a drive source for running the vehicle;
   a secondary motor; and
   a switching unit for controlling the primary motor and the secondary motor via a common inverter,
   wherein the secondary motor is an auxiliary unit driving motor, and
   wherein when the secondary motor is required to be driven while the vehicle is being driven by the primary motor with the engine being stopped, the inverter is switched to drive the secondary motor by the switching unit after the engine has been started up and the primary motor has been stopped.

8. The hybrid vehicle according to claim 7, wherein the secondary motor is at least one of a motor that drives a compressor of an air conditioner and a motor that drives an oil pump.

9. A hybrid vehicle comprising:
   an engine and a primary motor as a drive source for running the vehicle;
   a secondary motor; and
   a switching unit for controlling the primary motor and the secondary motor via a common inverter,
   wherein the secondary motor is an auxiliary unit driving motor, and
   wherein when the primary motor is required to be driven while an auxiliary unit is being driven by the secondary motor, the inverter is switched to drive the primary motor by the switching unit after the secondary motor has been stopped, and the auxiliary unit which has been driven by the secondary motor is then driven by the engine.

10. The hybrid vehicle according to claim 9, wherein the secondary motor is at least one of a motor that drives a compressor of an air conditioner and a motor that drives an oil pump.

11. A method for controlling a hybrid vehicle including an engine and a primary motor as a drive source for running the vehicle, and a secondary motor, the method comprising:

controlling the primary motor and the secondary motor via a common inverter, wherein the secondary motor is an auxiliary unit driving motor, and wherein the controlling step includes switching the inverter to the secondary motor from the primary motor after the engine has been started up and the primary motor has been stopped, in the event that the secondary motor is required to be driven while the vehicle is being driven by the primary motor with the engine being stopped.

12. A method for controlling a hybrid vehicle including an engine and a primary motor as a drive source for running the vehicle, and a secondary motor, the method comprising:

controlling the primary motor and the secondary motor via common inverter, wherein the secondary motor is an auxiliary unit driving motor, and wherein the controlling step includes switching the inverter to the primary motor from the secondary motor after the secondary motor has been stopped, and an auxiliary unit which has been driven by the secondary motor is then driven by the engine, in the event that the primary motor is required to be driven while the auxiliary unit is being driven by the secondary motor.

\* \* \* \* \*